(12) United States Patent
Kielian

(10) Patent No.: US 7,746,993 B2
(45) Date of Patent: Jun. 29, 2010

(54) RINGING PHONE LINE SELECTOR/VOIP SWITCH

(75) Inventor: Slawomir Kielian, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1304 days.

(21) Appl. No.: 11/224,267

(22) Filed: Sep. 12, 2005

(65) Prior Publication Data

US 2007/0064926 A1    Mar. 22, 2007

(51) Int. Cl.
    *H04M 1/00*    (2006.01)
(52) U.S. Cl. ...................................... 379/156
(58) Field of Classification Search ............... 379/156
    See application file for complete search history.

(56) References Cited

U.S. PATENT DOCUMENTS

2003/0108032 A1*  6/2003  Kato ........................ 370/352

* cited by examiner

*Primary Examiner*—Alexander Jamal
(74) *Attorney, Agent, or Firm*—Mark W. Croll; Paul F. Donovan

(57) ABSTRACT

A phone line selector module used in telecommunications related equipment for automatically sensing and switching back and forth between first and second input ports. The selector module includes a two-piece inter-fitting housing which receives a miniature printed circuit board therein. The miniature printed circuit board is used to mount phone line selector circuitry thereon. The phone line selector circuitry includes a first ring sensing circuit, a second ring sensing circuit, and a latching relay.

18 Claims, 3 Drawing Sheets

RINGING PHONE LINE SELECTOR/VOIP SWITCH

BACKGROUND OF THE INVENTION

This invention relates generally to switching circuitry for use with telecommunications related equipment. More particularly, it relates to a phone line selector module formed of phone line selector circuitry which allows for automatically sensing and switching from first input phone lines connected to an output line to second input phone lines connected to the output phone line in response to a ring signal.

As is generally well-known to those skilled in the art of the telecommunications industry, large scale copper wires have been commonly used to provide a plain old telephone service (POTS) from a central office of a local telephone company to a subscriber's or telephone user's premises. The subscriber typically must only use the wires that are connected to his premises for a single designated type of service (e.g., regular analog telephone services). In view of recently developed technology, there are now available new digital phone services, such as digital subscriber line services, which offer many benefits over the POTS. Thus, a subscriber might want to have the option of signing up the service for either POTS or digital phone services.

If a subscriber is currently signed up with POTS and desires to switch to digital phone services, the company offering the digital phone services or VOIP (Voice-Over Internet Protocol) service must sent out a service truck with a technician to the subscriber's premises for manually disconnecting the phone lines from the central office and re-connecting them to the VOIP lines of a broadband service provider. This suffers from the disadvantages of not only time-consuming labor-cost, but also the down-time for the subscriber to accommodate the visit from the technician.

Accordingly, there are various arrangements of switching circuits already known in the prior art which have been provided for automatically disconnecting the phone lines from the central office and re-connecting them to the VOIP lines of a broadband service provider. For example, there is known of switching circuits referred to as "Netja X Switcher" and "Easy Port Smart Switch" which are manufactured and sold by Sistellia Corporation of Stamford, N.Y. However, these products suffer from the problem that they typically are functioning as one-way latching switches wherein the switches are designed to perform the switching operation only once. In other words, once the switching operation is completed the device will be permanently latched in the selected mode and cannot be changed back. This would be quite troublesome to a subscriber who has switched from POTS to a digital phone service and becomes dissatisfied and desires to switch back to POTS.

Therefore, it would be desirable to provide improved phone line selector switch circuitry which permits the switching automatically back and forth between first input lines coupled to the regular analog telephone service and second input lines connected to the digital phone service. Further, it would be advantageous to fabricate the selector switch circuitry so that it can be re-used multiple times in order to effect added cost savings. In view of this, the inventor of the present invention has developed such improved phone line selector circuitry which includes an output port that is automatically switched from first input lines to second input lines in response to a ring signal detected on the second input lines.

SUMMARY OF THE INVENTION

Accordingly, it is a general object of the present invention to provide improved phone line selector circuitry which is relatively simple and economical to manufacture and assembly but has been traditionally unavailable.

It is an object of the present invention to provide an improved phone line selector module formed of phone line selector circuitry which allows for automatically sensing and switching from first input phone lines connected to an output line to second input phone lines connected to the output phone line in response to a ring signal.

It is another object of the present invention to provide phone line selector circuitry which includes a first ring sensing circuit, a second ring sensing circuit, and a latching relay device.

In a preferred embodiment of the present invention, there is provided a phone line selector module used in telecommunications related equipment for automatically sensing and switching back and forth between first and second input ports. The selector module includes a housing formed of a base member and a co-mating cover member. The base member includes a bottom wall, opposed side walls, and opposed end walls all formed integrally together. A printed circuit board sub-assembly is disposed within the housing and includes a miniature printed circuit board and phone line selector circuitry mounted on the miniature printed circuit board.

The phone line selector circuitry includes a first ring sensing circuit, a second ring sensing circuit, and a latching relay means. The first ring sensing circuit responsive to a signal received on a first input port causes the latching relay means to automatically switch from a normally-closed position to a normally-opened position for connecting the first input port to an output port. The second ring sensing circuit responsive to a signal received on a second input port causes the latching relay means to automatically switch from the normally-opened position back to a normally-closed position for connecting the second input port to an output port.

BRIEF DESCRIPTION OF THE DRAWINGS

These and other objects and advantages of the present invention will become more fully apparent from the following detailed description when read in conjunction with the accompanying drawings with like reference numerals indicating corresponding parts through-out, wherein:

FIG. 3 is an enlarged view of the miniature printed circuit board of FIG. 2, with the phone line selector circuitry mounted thereon.

DESCRIPTION OF THE PREFERRED EMBODIMENT

Figure 1:
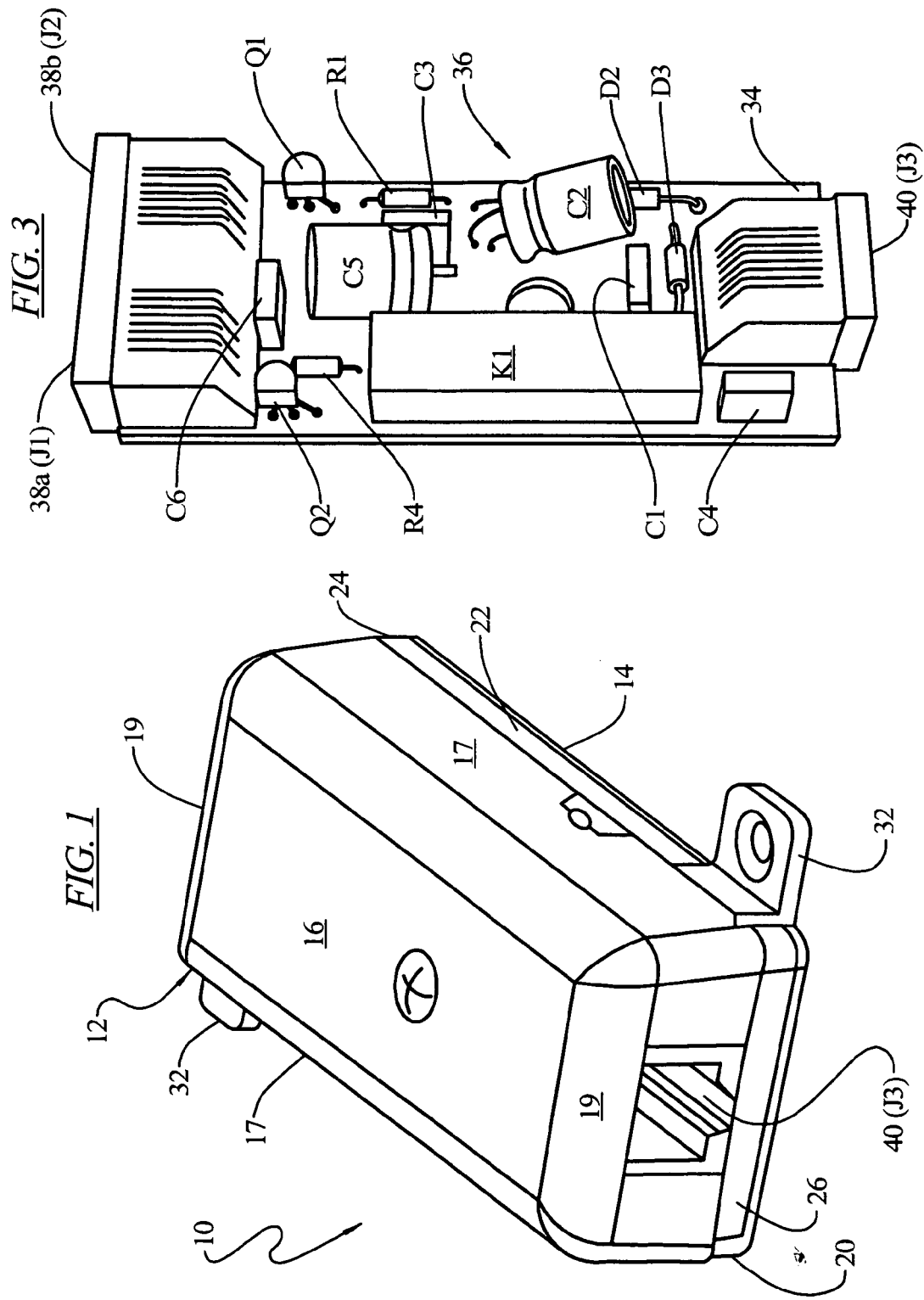
FIG. 1 is a perspective view of a phone line selector module, constructed in accordance with the principles of the present invention.
Figure 2:
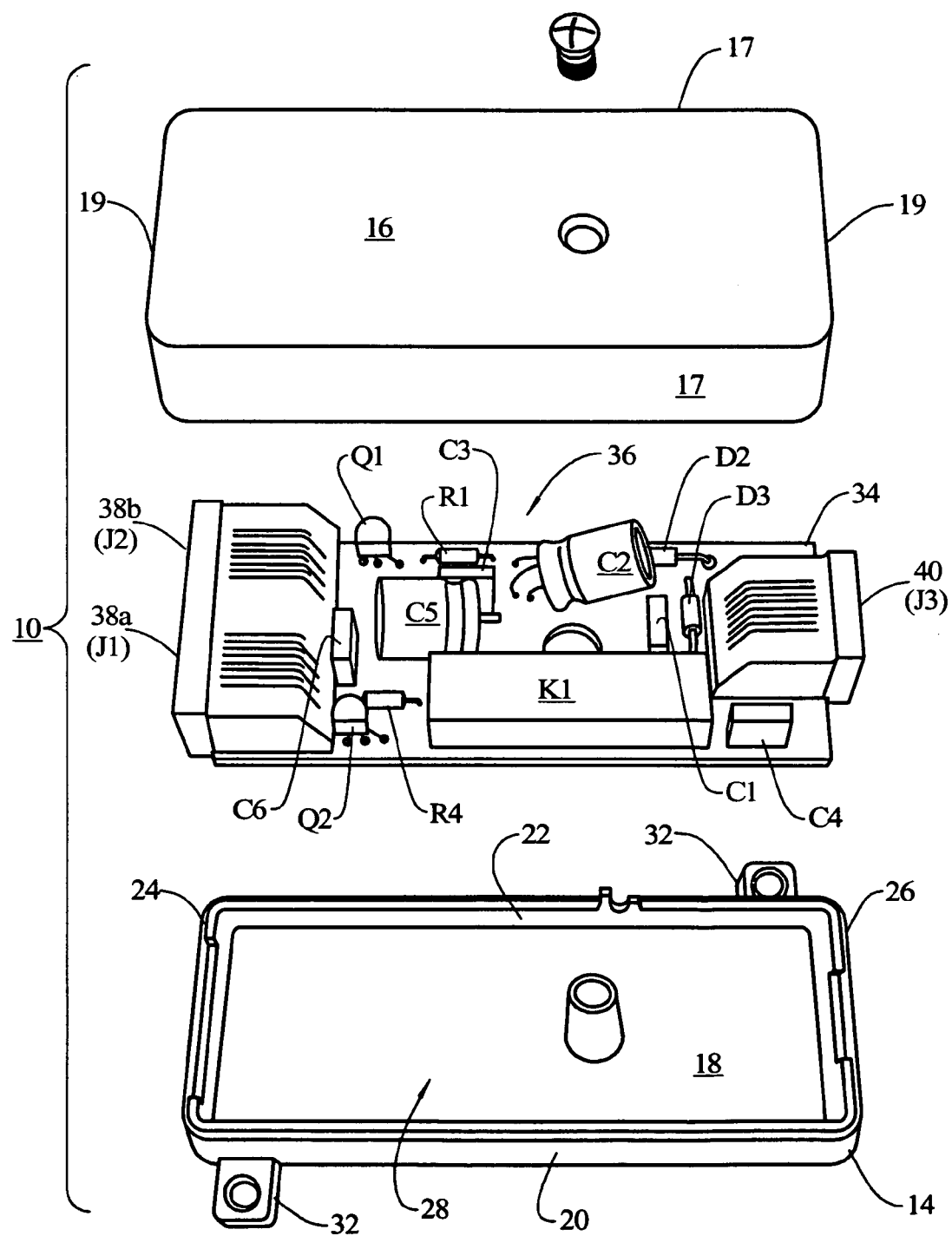
FIG. 2 is an exploded, perspective view of the phone line selector module of FIG. 1.

It is to be distinctly understood at the outset that the present invention shown in the drawings and described in detail in conjunction with the preferred embodiment is not intended to serve as a limitation upon the scope or teachings thereof, but is to be considered merely as an exemplification of the principles of the present invention.

Referring now in detail to the various views of the drawings, there is shown in FIGS. 1 through 4 an improved phone line selector module 10 which is constructed in accordance with the principles of the present invention. The phone line selector module 10 is typically used in telephone communications related equipment and other electronic applications. For instance, the phone line selector module 10 may be utilized by a digital phone service provider or VOIP (Voice-Over Internet Protocol) service provider. This module allows them to offer their services to customers or subscribers currently signed up with POTS (plain old telephone service) with decreased customer response time and reduced installation cost simultaneously.

This module permits the connections of both the existing telephone lines from the telephone company's central office and the VOIP lines from the broadband service provider to be inputted during the same installation and results in only a single output. By automatically detecting which one of the two input lines is active and routing that signal to the output, the broadband service provider can avoid time-consuming labor cost of sending a technician to the customer's residential premises for manually switching from the central office phone lines to the VOIP lines.

The phone line selector module 10 has a generally rectangular configuration, although other shaped constructions can be likewise utilized. The phone line selector module 10 includes a two-piece, molded inter-fitting housing 12 made of a suitable plastic material such as polycarbonate and the like which is comprised of a base member 14 and a co-mating cover member 16. The cover member is provided with opposed side walls 17 and opposed end walls 19, respectively. The cover member 16 can be suitably secured to the based member 14 in any number of conventional means known in the art.

The base member 14 has also a generally rectangular configuration and includes a bottom wall 18, opposed side walls 20, 22, and opposed end walls 24, 26, all formed integrally together. The side and end walls 20-26 extend upwardly from the bottom wall 18 to define a cavity 28 for receiving and enclosing a printed circuit board sub-assembly 30. Each of the opposed side walls 20, 22 is provided a mounting projection 32 for facilitating connection to a flat mounting surface (not shown).

The printed circuit board sub-assembly 30 includes a miniature printed circuit board 34, phone line selector circuitry 36, a pair of first and second input connector means 38a, 38b, and output connector means 40. The pair of input connector means 38a, 38b is preferably disposed adjacent to the top end of the printed circuit board 34, and the output connector means 40 is preferably disposed adjacent to the bottom end of the printed circuit board 34. Each of the first and second connector means is used for coupling to telecommunications related equipment and consists preferably of a standardized modular jack referred to as an 8-position RJ-45 jack for accommodating up to 4 wire-pairs of incoming telephone lines from either a central office or from a digital phone line provider. The first input connector means 38a designated also as J1 is adapted to receive a standardized modular plug which is used for coupling to telephone lines of a POTS. The second input connector means 38b designated also as J2 is adapted to receive a standardized modular plug which is used for coupling to VOIP lines of a digital phone service.

Similarly, the output connector means 40 is preferably a standardized modular jack referred to as an 8-position RJ-45 jack for terminating 4 wire-pairs telephone line cord. The output connector means 40 designated also as J3 is adapted to receive a standardized modular plug which is used for coupling to individual customer's or subscriber's telephone equipment. The input and output connector means provide for quick and easy mechanical connections to the phone line selector circuitry 36 of the present invention located on the printed circuit board 34. A detailed schematic circuit diagram of the selector circuitry 36 is illustrated in FIG. 4 of the drawings.

Figure 4:
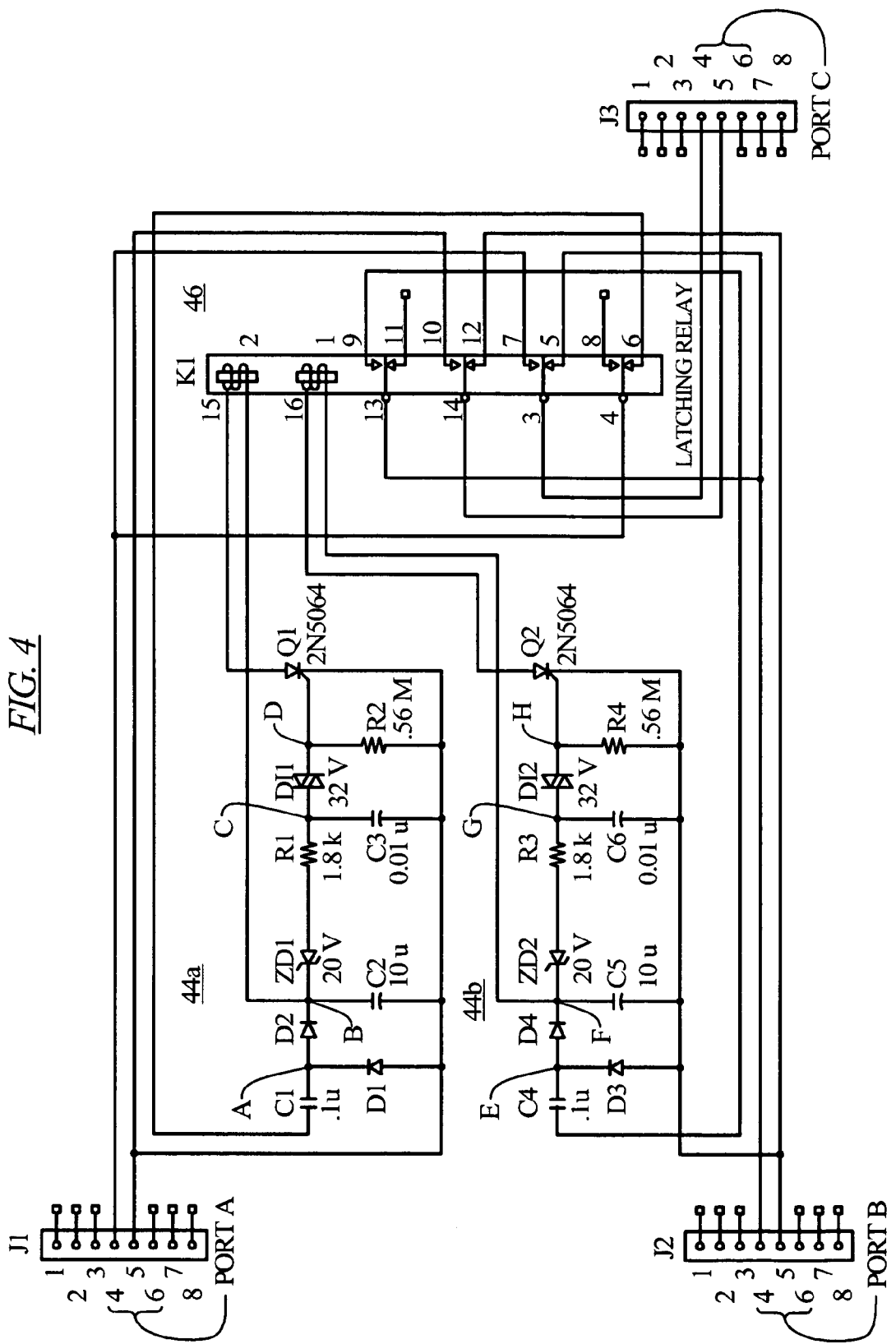
FIG. 4 is a schematic circuit diagram of the phone line selector circuitry for use in the module of FIG. 1.

As can best be seen from FIGS. 3 and 4, the phone line selector circuitry 36 is comprised of a first ring sensing circuit 44a associated with a Port A (pins 4 and 5 of the first input jack J1), a second ring sensing circuit 44b associated with a Port B (pins 4 and 5 of the second input jack J2) and latching relay means 46. In the default setting of the latching relay means 46, this is the normally-closed positions of the contacts, as depicted in FIG. 4. In this normally-closed position, the second input port B will be connected to the output Port C (pins 5 and 4 of the output jack J3) via the contacts 3-5 and 14-12 of the latching relay means 46. The selector circuitry 36 will remain in this first position until a ring signal appears across the Port A. When this occurs, the first input Port A will be automatically connected to the output Port C and will remain in this second position until another ring signal appears across the Port B.

The first ring sensing circuit 44a includes a coupling capacitor C1 having its one end coupled to pin 4 of the first input Port A via the normally-closed contacts 4-6 of the latching relay means 46. The latching relay means is comprised of a four-pole, double-throw latching relay K1 with dual coils. The first coil of the relay K1 is connected to the contacts 15-2, and the second coil thereof is connected to the contacts 16-1. The relay K1 has four normally-closed contacts 13-11, 14-12, 3-5, and 4-6 and has four normally-opened contacts 13-9, 14-10, 3-7, and 4-8. The relay K1 is similar to the one commercially available from Omnron Electronic Components LLC of Schaumburg, Il. 60173 under their Part No. G6AK-474P-ST40-US-DC5.

The other end of the capacitor C1 is joined to the cathode of a blocking diode D1 and to the anode of a rectifier diode D2 at node A. The cathode of the diode D2 is connected to one end of a storage capacitor C2, the cathode of a Zener diode ZD1, and the contact 2 of the first coil of the relay K1 at node B. The cathode of the Zener diode ZD1 is connected to one end of a resistor R1. The other end of the resistor R1 is joined to one end of a storage capacitor C3 and to one end of a diac device D11 at node C. The other end of the diac device D11 is connected to one end of a resistor R2 and to the gate electrode of a silicon-controlled rectifier Q1 at node D. The anode of the silicon-controlled rectifier Q1 is connected to the contact 15 of the first coil. The anode of the diode D1, the other ends of the capacitors C2, C3, the other end of the resistor R2 and the cathode of the silicon-controlled rectifier Q1 are all connected together and to pin 5 of the first input Port A. In this first or normally-closed position, pin 5 of the output Port C is connected via the contacts 3-5 to the pin 4 of the second input Port B, and the pin 4 of the output Port C is connected via the contacts 14-12 to the pin 5 of the second input Port B.

Similarly, in the second or normally-opened position, the second ring sensing circuit 44b includes a coupling capacitor C4 having its one end coupled to pin 4 of the second input Port B via the normally-opened contacts 13-9 of the latching relay means 46. The other end of the capacitor C4 is joined to the cathode of a blocking diode D3 and to the anode of a rectifier diode D4 at node E. The cathode of the diode D4 is connected to one end of a storage capacitor C5, the cathode of a Zener diode ZD2, and the contact 1 of the second coil of the relay K1 at node F. The cathode of the Zener diode ZD2 is connected to one end of a resistor R3. The other end of the resistor R3 is joined to one end of a storage capacitor C6 and to one end of a diac device D12 at node G. The other end of the diac device D12 is connected to one end of a resistor R4 and to the gate electrode of a silicon-controlled rectifier Q2 at node H. The anode of the silicon-controlled rectifier Q2 is connected to the contact 16 of the second coil. The anode of the diode D3, the other ends of the capacitors C5, C6, the other end of the resistor R4 and the cathode of the silicon-controlled rectifier Q2 are all connected together and to pin 5 of the second input Port B. In this second or normally-opened position, pin 5 of the output Port C is connected via the contacts 3-7 to the pin 4 of the first input Port A, and the pin 4 of the output Port C is connected via the contacts 14-10 to the pin 5 of the first input Port A.

In the preferred embodiment, the diodes D1-D4 are similar to type 1N4007, and the Zener diodes ZD1-ZD2 are similar to type 1N5250B-T. The diacs D11-D12 are similar to the ones manufactured and sold by Teccor under their Part No. HT-32A. The silicon-controlled Q1-Q2 are similar to the ones manufactured and sold by Teccor under their Part No. 2N5064.

Assuming a default position of the relay K1 (normally-closed position of the contacts as shown in FIG. 4), the operation of the phone line selector circuitry 36 will now be explained. In this default position, the second Port B (pins 4 and 5) is connected to the output Port C (pins 5 and 4) via the contacts 3-5 and 14-12 of the relay K1. Further, pin 4 of the first input Port A is connected via contact 4-6 of the relay K1 to the coupling capacitor C1 of the first ring sensing circuit 44a. When a ringing AC signal preferably of 70-90 VAC at a frequency of 20 Hz is sensed or detected on the first input Port A (pins 4 and 5), the positive cycles of the AC signal will be coupled through the capacitor C1 and rectified by the diode D2 to charge up the capacitor C2. The negative cycles of the AC signal will be blocked by the diode D1. The charge stored on the capacitor C2 is used to provide a current pulse to the first coil (contacts 15-2) of the relay K1 for switching from the normally-closed (first) position of the contacts to the normally-opened (second) position.

When the voltage across the Zener diode ZD1 exceeds 20 volts, it will start to conduct so as to charge up the capacitor C3. When the voltage across the diac D11 exceeds 32 volts, it will be rendered conductive so as to turn ON the silicon-controlled rectifier Q1. With the anode and cathode of the silicon-controlled rectifier Q1 shorted, a current pulse will flow from the capacitor C2 through the contacts 2-15 of the first coil of the relay K1 to the pin 5 of the first input Port A. This current flowing through the first coil of the relay K1 will cause it latch into the normally-opened position (opposite to the contact positions in FIG. 4).

Simultaneously, the first ring sensing circuit 44a will be disconnected from the first input Port A. The Port A is now active, which means that the Port A (pins 4 and 5) is connected to the output Port C (pins 5 and 4) via the contact 3-7 and 14-10 of the relay K1. In addition, the second ring sensing circuit 44b will become activated in which pin 4 of the second input Port B is connected via contacts 13-9 of the relay K1 to the coupling capacitor C4 thereof. In this state, the second input Port B (pins 4 and 5) is awaiting for a ringing AC signal.

When a ringing AC signal is sensed or detected, the second ring sensing circuit 44b will operate and function identically to that discussed previously with respect to the first ring sensing circuit 44a. Thus, the detailed operation of the second ring sensing circuit 44b will not be repeated herein. As a result, the second input Port B will be connected again to the output Port C, and the second ring sensing circuit 44b will be disconnected from the second Port B. The first ring sensing circuit 44a will now become active, awaiting for a ringing AC signal to appear on the coupling capacitor C1 thereof.

The phone line selector circuitry of the present invention has the following advantages over the prior art as follows:
(1) it can be re-used multiple times for switching back and forth between the two input Ports A and B;
(2) it has a better efficiency and a longer product life since each of the respective ring sensing circuits for the active port is deactivated;
(3) it utilizes an AC coupling which makes the switching operation independent of tip and ring allocation on the pins 4 and 5 of the input Ports A and B, thereby rendering easy installation; and
(4) it is capable of automatic switching which eliminates the need for a technician to visit a customer's premises and perform a manual switching of the input ports.

From the foregoing detailed description, it can thus be seen that the present invention provides a phone line selector module used in telephone communications related equipment for switching back and forth between first and second input ports. The selector module includes a two-piece inter-fitting housing for receiving a miniature printed circuit board therein. The miniature printed circuit board is used to mount phone line selector circuitry thereon. The phone line selector circuitry includes a first ring sensing circuit, a second ring sensing circuit, and a latching relay device.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

The invention claimed is:

1. A phone line selector module used in telecommunications related equipment for automatically sensing and switching back and forth between first and second input ports, comprising:

a housing formed of a base member and a co-mating cover member, said base member including a bottom wall, opposed side walls, and opposed end walls all formed integrally together;

a printed circuit board sub-assembly being disposed within said housing and including a miniature printed circuit board and phone line selector circuitry mounted on said miniature printed circuit board;

said phone line selector circuitry including a first ring sensing circuit, a second ring sensing circuit, and latching relay means;

said first ring sensing circuit being responsive to a signal received on a first input port to cause said latching relay means to automatically switch from a normally-closed position to a normally-opened position for connecting the first input port to an output port;

said second ring sensing circuit being responsive to a signal received on a second input port to cause said latching relay means to automatically switch from the normally-opened position back to the normally-closed position for connecting the second input port to said output port;

only said first ring sensing circuit being activated so as to place automatically the first input port in a state awaiting to sense the signal when said second input port is actively connected to said output port; and only said second ring sensing circuit being activated so as to place automatically the second input port in a state awaiting to sense the signal when said first input port is connected to said output port.

2. A phone line selector module as claimed in claim 1, further comprising first and second input connector means operatively connected to a first end of said miniature printed circuit board, said first input connector means associated with said first input port and being adapted for coupling to VOIP lines of a digital phone service, said second input connector means associated with said second input port and being adapted for coupling to telephone lines of a POTS.

3. A phone line selector module as claimed in claim 2, further comprising output connector means operatively connected to a second end of said miniature printed circuit board, said output connector means associated with the output port and being adapted for coupling to a customer's telephone communications related equipment.

4. A phone line selector module as claimed in claim 2, wherein each of said first and second input connector means is comprised of a 4 wire-pair RJ-45 jack.

5. A phone line selector module as claimed in claim 3, wherein each of said output connector means is comprised of a 4 wire-pair RJ-45 jack.

6. A phone line selector module as claimed in claim 1, wherein said latching relay means is comprised of a four-pole, double-throw latching relay with dual coils.

7. A phone line selector module as claimed in claim 1, wherein said signal consists of a ringing voltage of 70-90 VAC at a frequency of 20 Hz.

8. A phone line selector module as claimed in claim 1, wherein said first ring sensing circuit is coupled to a first coil of said latching relay means and said second ring sensing circuit is coupled to a second coil of said latching relay means.

9. A phone line selector module as claimed in claim 1, wherein said housing is made of a polycarbonate material.

10. A phone line selector module used in telecommunications related equipment for automatically sensing and switching back and forth between first and second input ports, comprising:

housing means formed of a base member and a co-mating cover member;

miniature printed circuit board means disposed within said housing means for mounting phone line selector circuit means;

said phone line selector circuit means including first ring sensing circuit means, second ring sensing circuit means, and latching relay means;

said first ring sensing circuit means being responsive to a signal received on a first input port for causing said latching relay means to automatically switch from a normally-closed position to a normally-opened position for connecting the first input port to an output port;

said second ring sensing circuit means being responsive to a signal received on a second input port for causing said latching relay means to automatically switch from the normally-opened position back to the normally-closed position for connecting the second input port to said output port;

said first ring sensing circuit means including a coupling capacitor, a first and second storage capacitor, a blocking diode, a Zener diode, a first and second resistor, a diac and a silicon-controlled rectifier; and said second ring sensing circuit means including a coupling capacitor, a first and second storage capacitor, a blocking diode, a Zener diode, a first and second resistor, a diac and a silicon-controlled rectifier.

11. A phone line selector module as claimed in claim 10, further comprising first and second input connector means operatively connected to a first end of said miniature printed circuit board, said first input connector means associated with said first input port and being adapted for coupling to VOIP lines of a digital phone service, said second input connector means associated with said second input port and being adapted for coupling to telephone lines of a POTS.

12. A phone line selector module as claimed in claim 11, further comprising output connector means operatively connected to a second end of said miniature printed circuit board, said output connector means associated with the output port and being adapted for coupling to a customer's telephone communications related equipment.

13. A phone line selector module as claimed in claim 11, wherein each of said first and second input connector means is comprised of a 4 wire-pair RJ-45 jack.

14. A phone line selector module as claimed in claim 10, wherein said first ring sensing circuit means is coupled to a first coil of said latching relay means and said second ring sensing circuit means is coupled to a second coil of said latching relay means.

15. A phone line selector module as claimed in claim 10, wherein said latching relay means is comprised of a four-pole, double-throw latching relay with dual coils.

16. Phone line selector circuitry module used in telecommunications related equipment for automatically sensing and switching back and forth between first and second input ports, comprising:

first ring sensing circuit means;

second ring sensing circuit means;

latching relay means;

said first ring sensing circuit means being responsive to a signal received on a first input port for causing said latching relay means to automatically switch from a normally-closed position to a normally-opened position for connecting the first input port to an output port;

said second ring sensing circuit means being responsive to a signal received on a second input port for causing said latching relay means to automatically switch from the normally-opened position back to the normally-closed position for connecting the second input port to said output port;

only said first ring sensing circuit being activated so as to place automatically the first input port in a state awaiting to sense the signal when said second input port is actively connected to said output port; and only said second ring sensing circuit being activated so as to place automatically the second input port in a state awaiting to sense the signal when said first input port is connected to said output port.

17. Phone line selector circuitry as claimed in claim 16, wherein said latching relay means is comprised of a four-pole, double-throw latching relay with dual coils.

18. Phone line selector circuitry as claimed in claim 16, wherein said first ring sensing circuit means is coupled to a first coil of said latching relay means and said second ring sensing circuit means is coupled to a second coil of said latching relay means.

* * * * *